(12) United States Patent
Torii et al.

(10) Patent No.: US 11,725,721 B2
(45) Date of Patent: Aug. 15, 2023

(54) VEHICLE DRIVE APPARATUS THAT REDUCES OR PREVENTS AN INCREASE IN OIL AGITATION CAUSED BY A CHAIN

(71) Applicant: AISIN CORPORATION, Kariya (JP)

(72) Inventors: Takahiro Torii, Anjo (JP); Kazuki Kojima, Anjo (JP); Masahiro Ito, Anjo (JP); Yuya Ishihara, Kariya (JP)

(73) Assignee: AISIN CORPORATION, Kariya (JP)

( * ) Notice: Subject to any disclaimer, the term of this patent is extended or adjusted under 35 U.S.C. 154(b) by 216 days.

(21) Appl. No.: 17/273,998

(22) PCT Filed: Jan. 9, 2020

(86) PCT No.: PCT/JP2020/000430
§ 371 (c)(1),
(2) Date: Mar. 5, 2021

(87) PCT Pub. No.: WO2020/145339
PCT Pub. Date: Jul. 16, 2020

(65) Prior Publication Data
US 2021/0356034 A1 Nov. 18, 2021

(30) Foreign Application Priority Data
Jan. 11, 2019 (JP) .................................. 2019-003679

(51) Int. Cl.
*F16H 57/04* (2010.01)
*F16H 57/02* (2012.01)

(52) U.S. Cl.
CPC ....... *F16H 57/0424* (2013.01); *F16H 57/045* (2013.01); *F16H 57/0409* (2013.01);
(Continued)

(58) Field of Classification Search
CPC ............. F16H 57/0409; F16H 57/0421; F16H 57/0423; F16H 57/0424; F16H 57/0436;
(Continued)

(56) References Cited

U.S. PATENT DOCUMENTS

| 4,896,561 A * | 1/1990 | Hayakawa .......... F16H 57/0421 184/6.12 |
| 10,281,006 B2 | 5/2019 | Hirano |

(Continued)

FOREIGN PATENT DOCUMENTS

| FR | 3086028 A1 * | 3/2020 | ......... F16H 57/0423 |
| WO | WO-2005115790 A1 * | 12/2005 | ........... B60K 17/344 |
| WO | 2016/136356 A1 | 9/2016 | |

OTHER PUBLICATIONS

Feb. 25, 2020 Search Report issued in International Patent Application No. PCT/JP2020/000430.

*Primary Examiner* — Minh Truong
(74) *Attorney, Agent, or Firm* — Oliff PLC

(57) ABSTRACT

An intermediate wall is provided with a return oil hole through which oil discharged from a friction engagement device returns toward an oil reservoir. A chain drive is disposed adjacent to the intermediate wall. The chain drive transmits a driving force from an input member and/or a rotary electric machine to an oil pump. There is provided an oil guide through which oil flowing through the return oil hole is guided to a region other than a chain placement region inside a case. The chain placement region is a region where a chain of the chain drive is placed.

20 Claims, 10 Drawing Sheets

(52) U.S. Cl.
CPC ..... *F16H 57/0436* (2013.01); *F16H 57/0441* (2013.01); *F16H 57/0473* (2013.01); *F16H 57/0461* (2013.01); *F16H 2057/02034* (2013.01)

(58) Field of Classification Search
CPC ............. F16H 57/0441; F16H 57/0461; F16H 57/0473; F16H 2057/0216
See application file for complete search history.

(56) References Cited

U.S. PATENT DOCUMENTS

| | | | | |
|---|---|---|---|---|
| 2006/0065487 | A1* | 3/2006 | Tominaga | F16H 57/05 184/6.12 |
| 2008/0135339 | A1* | 6/2008 | Miller | F16H 57/0434 184/6.22 |
| 2011/0132141 | A1* | 6/2011 | Mizuno | F16H 41/30 74/730.1 |
| 2013/0037690 | A1* | 2/2013 | Lee | F16H 57/0441 248/674 |
| 2016/0363201 | A1* | 12/2016 | McNally | B60K 17/348 |
| 2017/0254409 | A1* | 9/2017 | Sakaguchi | F02F 7/0073 |
| 2018/0238434 | A1* | 8/2018 | Zhang | F16H 57/0423 |
| 2020/0263782 | A1* | 8/2020 | Toyoshima | F16H 57/0483 |

* cited by examiner

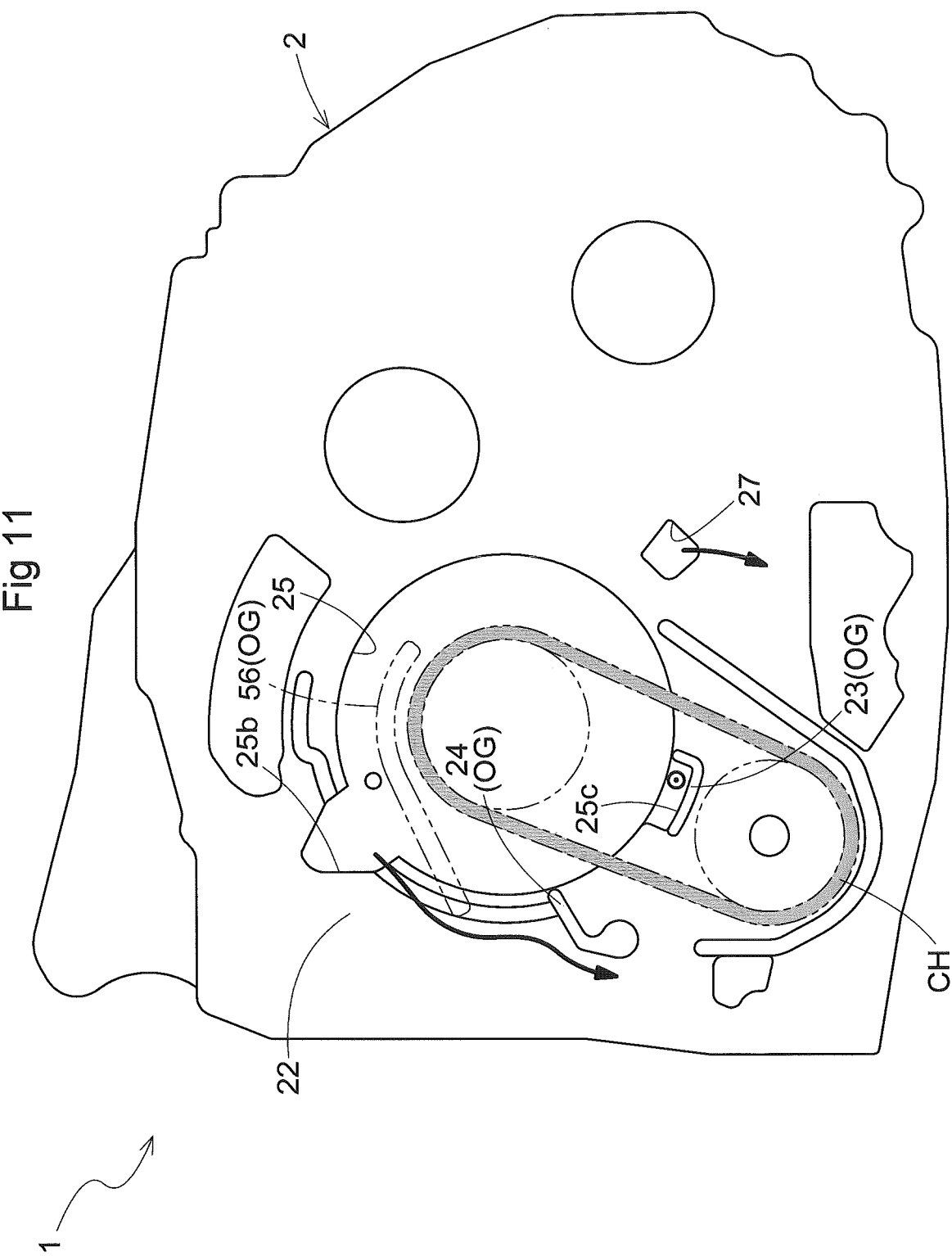

VEHICLE DRIVE APPARATUS THAT REDUCES OR PREVENTS AN INCREASE IN OIL AGITATION CAUSED BY A CHAIN

TECHNICAL FIELD

The present disclosure relates to vehicle drive apparatuses.

BACKGROUND ART

A vehicle drive apparatus that has been in use includes: an input member drivingly connected to an internal combustion engine; output members drivingly connected to wheels; a friction engagement device; a rotary electric machine; a transmission; and a case housing the input member, the output members, the friction engagement device, the rotary electric machine, and the transmission. An example of such a vehicle drive apparatus is disclosed in WO 2016/136356 (Patent Document 1). The vehicle drive apparatus disclosed in Patent Document 1 includes an oil pump that is driven by a driving force from at least one of the internal combustion engine and the rotary electric machine through a chain drive. The chain drive is disposed between the friction engagement device and the transmission and between the rotary electric machine and the transmission in an axial direction.

This structure may involve disposing an intermediate wall of the case between the friction engagement device and the transmission and between the rotary electric machine and the transmission in the axial direction. In this case, an oil reservoir is often defined in an internal space of the case at a location closer to the transmission than the intermediate wall, and the chain drive is often disposed toward the transmission relative to the intermediate wall. A return oil hole may be defined in the intermediate wall in order to return oil (e.g., oil that has been supplied to friction engagement elements of the friction engagement device so as to cool the friction engagement elements and has then been discharged therefrom) toward the oil reservoir.

RELATED ART DOCUMENTS

Patent Documents

Patent Document 1: WO 2016/136356

SUMMARY OF THE DISCLOSURE

Problem to be Solved by the Disclosure

When oil discharged from the friction engagement elements is to be returned toward the oil reservoir through the return oil hole of the intermediate wall, the position of the return oil hole is normally decided in accordance with a position where the oil is to be discharged from the friction engagement elements. When the chain drive is disposed adjacent to a portion of the intermediate wall toward the transmission, however, oil that has reached a location toward the oil reservoir through the return oil hole is likely to enter a chain placement region of the chain drive. Upon entrance of the oil into the chain placement region, oil agitation by a chain increases. This unfortunately increases the drive loss of the oil pump and/or produces minute air bubbles in the oil, resulting in a reduction in the amount of discharge from the oil pump.

Accordingly, what is desired is an approach to reducing or preventing an increase in oil agitation caused by the chain, if the chain drive is disposed adjacent to the intermediate wall provided inside the case.

Means for Solving the Problem

A vehicle drive apparatus according to the present disclosure includes: an input member drivingly connected to an internal combustion engine; an output member drivingly connected to a wheel; a friction engagement device; a rotary electric machine drivingly connected to the input member through the friction engagement device; a transmission disposed between the rotary electric machine and the output member; an oil pump; and a case housing the input member, the output member, the friction engagement device, the rotary electric machine, the transmission, and the oil pump.

The case includes an intermediate wall disposed between the friction engagement device and the transmission and between the rotary electric machine and the transmission in an axial direction.

An oil reservoir to store oil is defined in an internal space of the case at a location closer to the transmission than the intermediate wall.

The oil pump supplies oil stored in the oil reservoir to a friction engagement element of the friction engagement device.

The intermediate wall is provided with a return oil hole through which oil discharged from the friction engagement element returns toward the oil reservoir.

A chain drive is disposed adjacent to a portion of the intermediate wall toward the transmission. The chain drive includes a chain to transmit a driving force from at least one of the input member and the rotary electric machine to the oil pump.

The vehicle drive apparatus further includes an oil guide through which oil flowing through the return oil hole is guided to a region other than a chain placement region inside the case. The chain placement region is a region where the chain is placed.

The oil flowing through the return oil hole is guided through the oil guide and returned to the oil reservoir.

This structure includes the oil guide. Thus, oil flowing toward the transmission through the return oil hole defined in the intermediate wall of the case is returnable to the oil reservoir through a region other than the chain placement region (i.e., through a region where no chain is placed). Accordingly, if the chain drive is disposed adjacent to the intermediate wall provided inside the case, this structure would reduce the amount of oil that enters the chain placement region of the chain drive after having reached a location toward the oil reservoir through the return oil hole. Consequently, this structure is able to reduce or prevent an increase in oil agitation caused by the chain.

Further features and advantages of the techniques according to the present disclosure will be more apparent from the description of illustrative and non-limiting embodiments given below with reference to the drawings.

BRIEF DESCRIPTION OF THE DRAWINGS

FIG. 11 is a diagram of the vehicle drive apparatus as viewed from a location toward a transmission in the axial direction.

MODES FOR CARRYING OUT THE DISCLOSURE

First Embodiment

A vehicle drive apparatus according to a first embodiment will be described with reference to the drawings. The vehicle drive apparatus 1 according to the present embodiment is an apparatus for driving a hybrid vehicle (hereinafter referred to as a "hybrid vehicle drive apparatus"). The hybrid vehicle drive apparatus includes both of an internal combustion engine EG and a rotary electric machine 13 each functioning as a driving force source for wheels W. The vehicle drive apparatus 1 transmits a torque (which is generated by at least one of the internal combustion engine EG and the rotary electric machine 13) to the wheels W so as to cause a vehicle to travel. The vehicle drive apparatus 1 according to the present embodiment is provided in the form of an apparatus for driving a front-engine front-drive (FF) vehicle.

Figure 1:
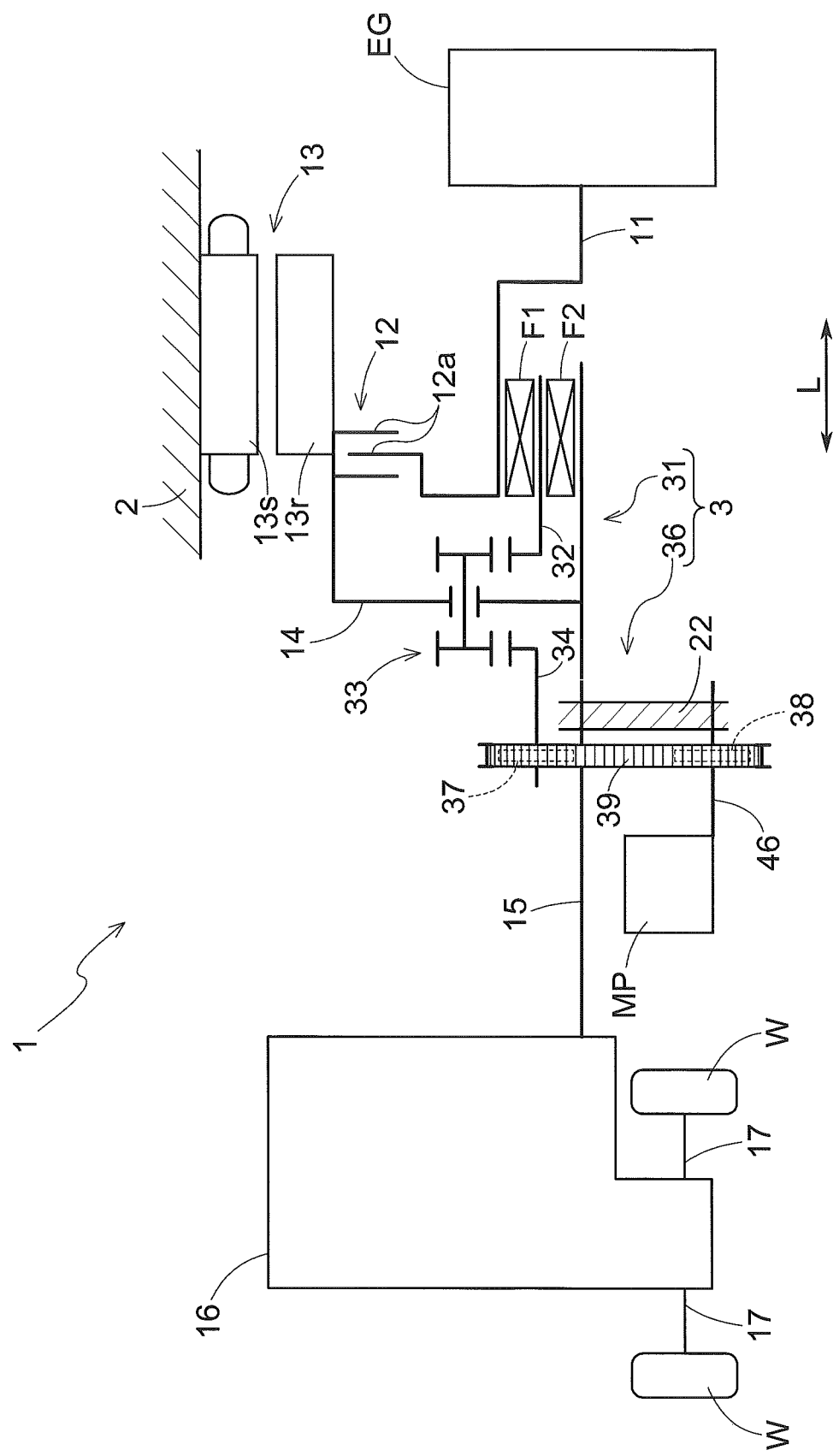
FIG. 1 is a schematic diagram of a vehicle drive apparatus according to a first embodiment.

As illustrated in FIG. 1, the vehicle drive apparatus 1 includes: an input member 11 drivingly connected to the internal combustion engine EG; a friction engagement device 12; the rotary electric machine 13; a transmission 16; and output members 17 drivingly connected to the wheels W. The input member 11, the friction engagement device 12, the rotary electric machine 13, the transmission 16, and the output members 17 are provided in this order from a location toward the internal combustion engine EG along a power transmission path connecting the internal combustion engine EG to the wheels W. The input member 11, the friction engagement device 12, the rotary electric machine 13, the transmission 16, and the output members 17 are housed in a case (drive apparatus case) 2.

As used herein, the term "drivingly connected to" refers to a state where two rotary elements are connected to each other such that a driving force is transmittable therebetween. This concept encompasses not only a state where two rotary elements are connected to each other such that the two rotary elements rotate together, but also a state where two rotary elements are connected to each other through one or more transmission members such that a driving force is transmittable therebetween. Such transmission members include various members (e.g., a shaft, a gear mechanism, a belt, and a chain) that transmit rotation at equal or varying speeds. Such transmission members may include engagement devices (e.g., a friction engagement device and a meshing type engagement device) that transmit rotation and driving force selectively.

As used herein, the term "rotary electric machine" is a concept encompassing all of a motor (electric motor), a generator (power generator), and a motor generator that functions as both of a motor and a generator when necessary.

The input member 11 is drivingly connected to the internal combustion engine EG The internal combustion engine EG is a motor (e.g., a gasoline engine or a diesel engine) to be driven by fuel combustion inside the engine such that power is derived therefrom. The input member 11 is drivingly connected to an output shaft (e.g., a crankshaft) of the internal combustion engine EG The input member 11 is connected to the output shaft of the internal combustion engine EG such that the input member 11 rotates together with the output shaft, or drivingly connected to the output shaft of the internal combustion engine EG through a different member, such as a damper. The input member 11 is drivingly connected to the rotary electric machine 13 through the friction engagement device 12.

The friction engagement device 12 connects the input member 11 to the rotary electric machine 13 selectively. In other words, the friction engagement device 12 is able to disconnect the internal combustion engine EG from the rotary electric machine 13. The friction engagement device 12 functions as an engagement device for internal combustion engine disconnection, which disconnects the internal combustion engine EG from the vehicle drive apparatus 1. The friction engagement device 12 is a hydraulically operated friction engagement device. For example, a clutch, such as a wet multi-plate clutch, may be used as the friction engagement device 12.

The friction engagement device 12 includes friction engagement elements 12a. The friction engagement elements 12a are, for example, a plurality of friction plates stacked in an axial direction L. Engagement of the friction engagement elements 12a brings the input member 11 and the rotary electric machine 13 into a connected state. The friction engagement elements 12a may be brought into sliding engagement (i.e., slip engagement). This enables the friction engagement device 12 to transmit power, with the input member 11 and the rotary electric machine 13 rotating at different speeds.

The rotary electric machine 13 is disposed radially outward of the friction engagement device 12. The rotary electric machine 13 includes: a stator 13s secured to the case 2; and a rotor 13r rotatably supported at a location radially inward of the stator 13s. The rotary electric machine 13 performs power running upon receiving supply of electric power from a power storage device (not illustrated), or supplies electric power (which is generated by, for example, a torque of the internal combustion engine EG and/or an inertial force of the vehicle) to the power storage device such that the electric power is stored in the power storage device. The rotor 13r is drivingly connected to the input member 11 through the friction engagement device 12 and is connected to a rotor connecting member 14 such that the rotor 13r rotates together with the rotor connecting member 14. The rotor connecting member 14 is connected to a transmission input member 15 such that the rotor connecting member 14 rotates together with the transmission input member 15. The transmission input member 15 is an input member of the transmission 16.

The transmission 16 changes the rotation speed of the transmission input member 15 in accordance with a predetermined speed ratio and transmits the resulting rotation speed to the output members 17. As used herein, the term "speed ratio" refers to the ratio of the rotation speed of the transmission input member 15 to the rotation speed of the output members 17. The speed ratio is a value calculated by dividing the rotation speed of the transmission input member 15 by the rotation speed of the output members 17. Examples of the transmission 16 may include a stepped automatic transmission, a stepped manual transmission, and an automatic continuously variable transmission. The transmission 16 may include, for example, a counter gear mechanism and/or a differential mechanism. In the present embodiment, a pair of right and left output members 17 is drivingly connected to a differential mechanism, and the wheels W are each drivingly connected to an associated one of the right and left output members 17.

As illustrated in FIG. 1, the vehicle drive apparatus 1 according to the present embodiment further includes a mechanical oil pump MP and a pump drive mechanism 3 to drive the mechanical oil pump MP. The pump drive mechanism 3 includes: a selector 31 to select a power source for driving the mechanical oil pump MP; and a chain drive 36 to transmit, to the mechanical oil pump MP, a driving force provided from the power source selected by the selector 31. In the present embodiment, the mechanical oil pump MP is equivalent to an "oil pump".

The selector 31 includes a first one-way clutch F1, a second one-way clutch F2, an input gear forming member 32, a gear row 33, and an output gear forming member 34. The first one-way clutch F1 is engaged when the rotation speed of the input member 11 is equal to or higher than the rotation speed of the input gear forming member 32. The first one-way clutch F1 is disengaged when the rotation speed of the input member 11 is lower than the rotation speed of the input gear forming member 32. The second one-way clutch F2 is engaged when the rotation speed of the transmission input member 15 is equal to or higher than the rotation speed of the input gear forming member 32. The second one-way clutch F2 is disengaged when the rotation speed of the transmission input member 15 is lower than the rotation speed of the input gear forming member 32. Thus, a driving force is transmitted from either one of the internal combustion engine EG (or the input member 11) and the rotary electric machine 13 whose rotation speed is higher to the input gear forming member 32. When the internal combustion engine EG (or the input member 11) and the rotary electric machine 13 rotate at equal speed, a driving force is transmitted from both of the internal combustion engine EG (or the input member 11) and the rotary electric machine 13 to the input gear forming member 32.

The input gear forming member 32 is drivingly connected to the output gear forming member 34 through the gear row 33. A first sprocket 37 of the chain drive 36 is secured to the output gear forming member 34.

The chain drive 36 includes the first sprocket 37, a second sprocket 38, and a chain 39. The first sprocket 37 is secured to the output gear forming member 34. The second sprocket 38 is secured to a pump shaft 46 of the mechanical oil pump MP. The chain 39 is wound around the first sprocket 37 and the second sprocket 38. The chain drive 36 transmits rotation of the output gear forming member 34 to the pump shaft 46. Thus, the mechanical oil pump MP is drivable by the driving force transmitted from either one of the internal combustion engine EG (or the input member 11) and the rotary electric machine 13 whose rotation speed is higher. When the internal combustion engine EG (or the input member 11) and the rotary electric machine 13 rotate at equal speed, the mechanical oil pump MP is drivable by the driving force transmitted from both of the internal combustion engine EG (or the input member 11) and the rotary electric machine 13.

In the present embodiment, an electric oil pump EP (see FIG. 3) is provided in addition to the mechanical oil pump MP. The electric oil pump EP is driven by a dedicated drive motor (not illustrated).

Figure 2:
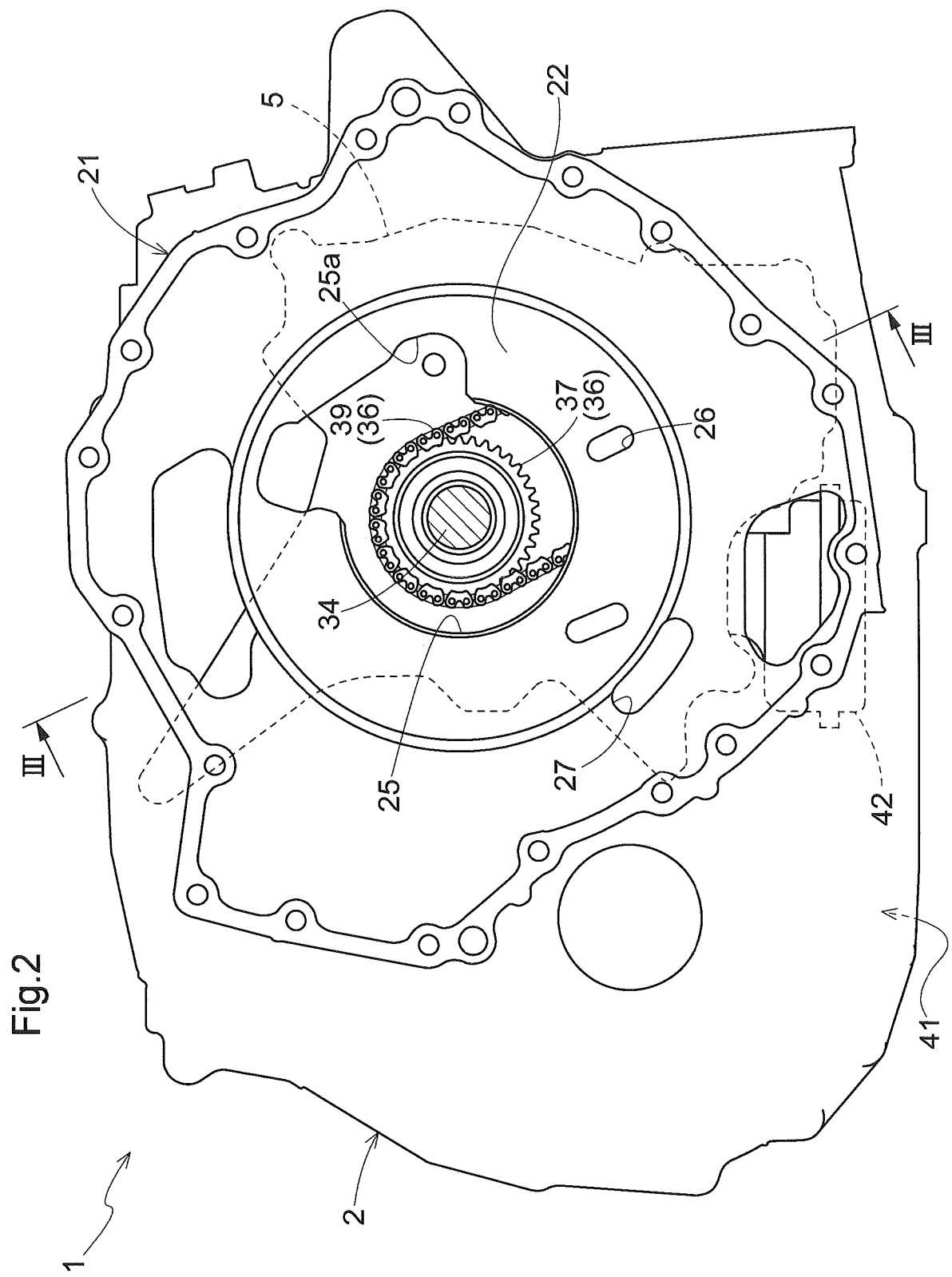
FIG. 2 is a diagram of the vehicle drive apparatus as viewed from a location toward a rotary electric machine in an axial direction.
Figure 3:
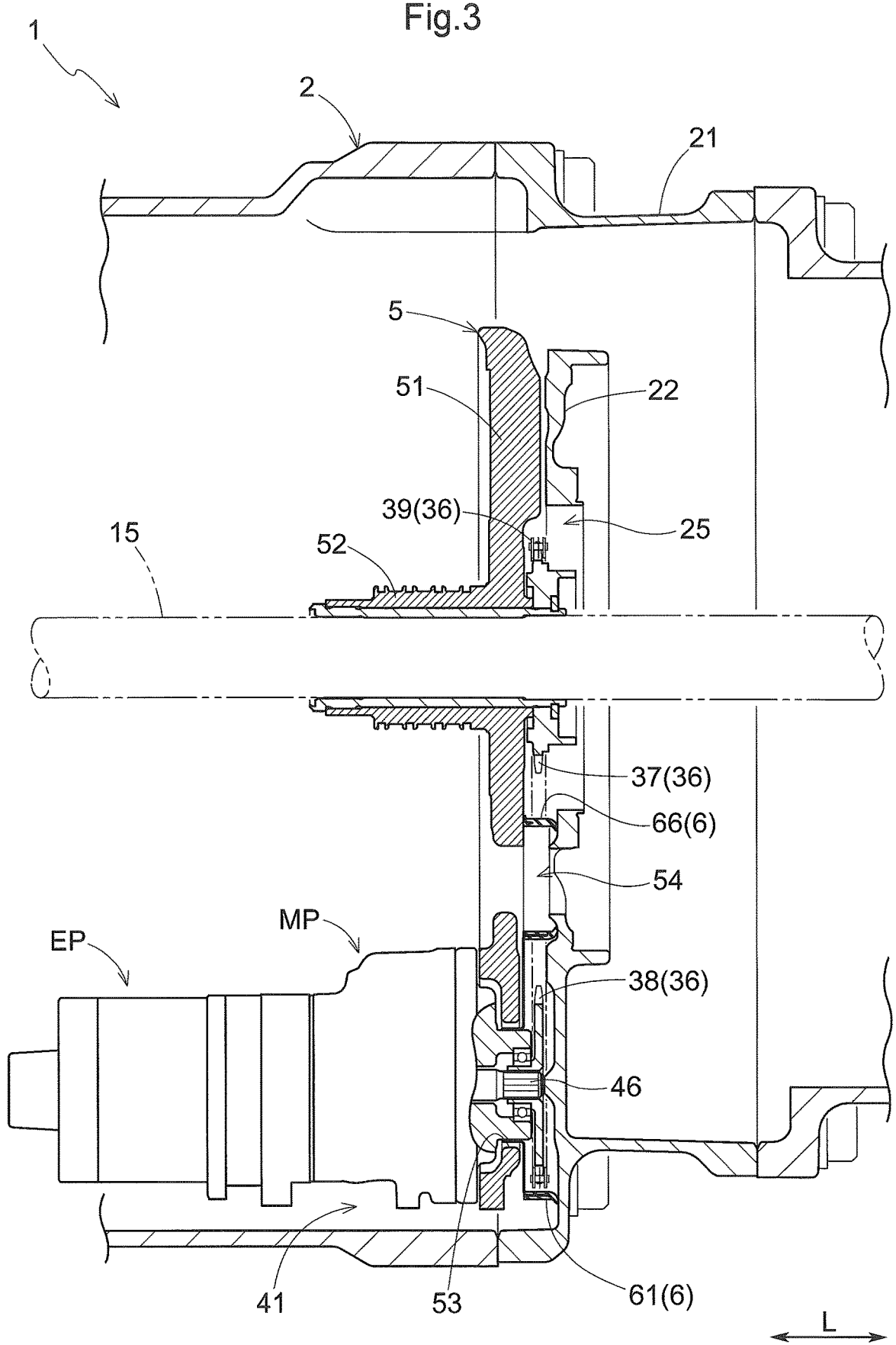
FIG. 3 is a cross-sectional view of the vehicle drive apparatus taken along the line in FIG. 2.

As illustrated in FIGS. 2 and 3, the case 2 includes: a peripheral wall 21 covering the outside of components, such as the friction engagement device 12, the rotary electric machine 13, and the transmission 16; a pair of end walls (not illustrated) covering the ends of the friction engagement device 12, the rotary electric machine 13, and the transmission 16 in the axial direction L; and an intermediate wall 22. The intermediate wall 22 is disposed between the friction engagement device 12 and the transmission 16 and between the rotary electric machine 13 and the transmission 16 in the axial direction L. Specifically, the intermediate wall 22 divides the inner space of the case 2 into: a space (first space) in which the friction engagement device 12 and the rotary electric machine 13 are mainly housed; and a space (second space) in which the transmission 16 is mainly housed.

As illustrated in FIG. 3, an oil reservoir 41 is defined inside the case 2. The oil reservoir 41 stores oil that is an automatic transmission fluid (ATF). The oil reservoir 41 is defined in an internal space of the case 2 at a location closer to the transmission 16 than the intermediate wall 22 in the axial direction L. The mechanical oil pump MP and the electric oil pump EP are each driven by the drive motor and at least one of the internal combustion engine EG and the rotary electric machine 13 so as to discharge the oil stored in the oil reservoir 41.

Figure 4:
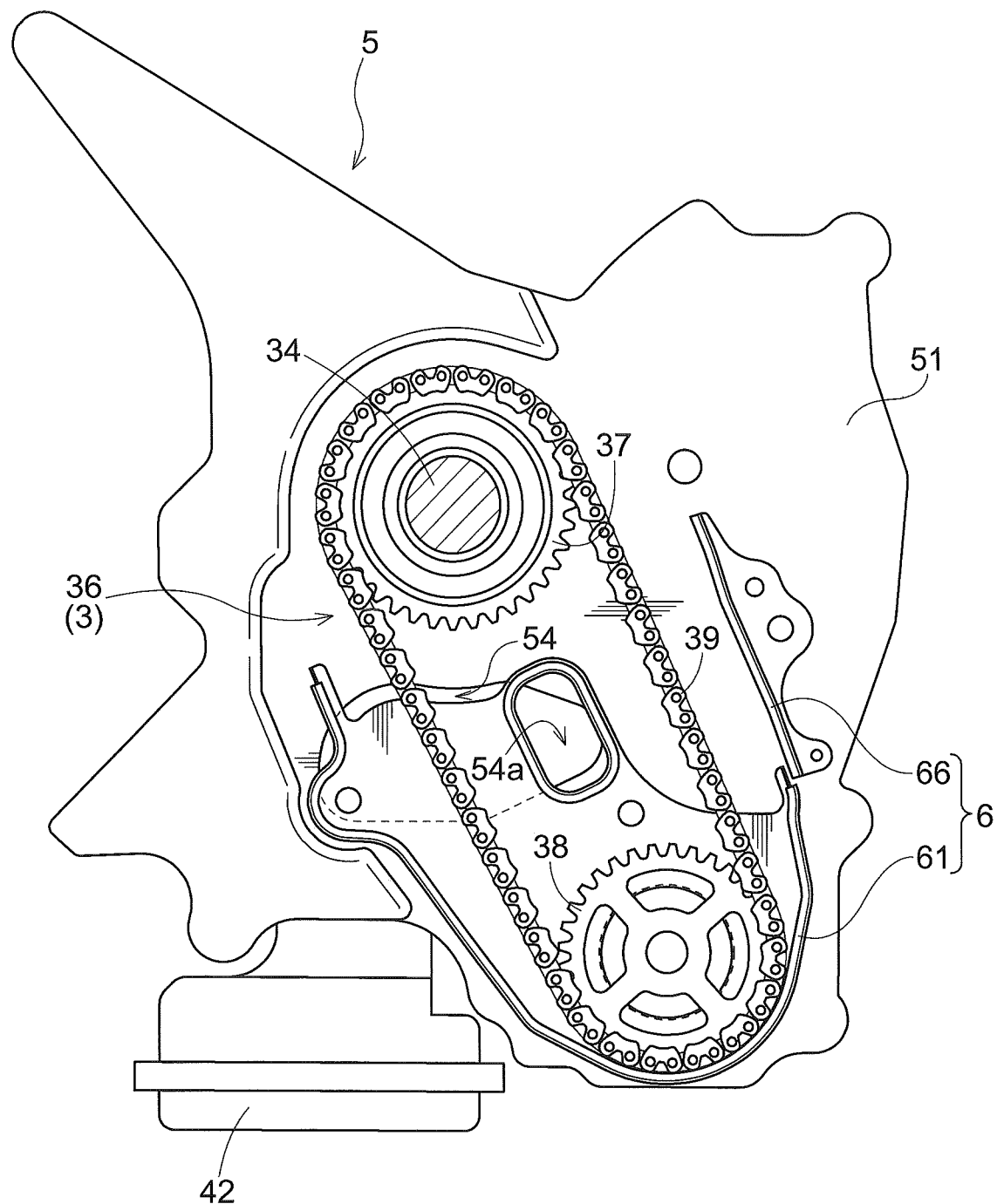
FIG. 4 is a diagram of the vehicle drive apparatus to which a support member and a chain cover are assembled.

The pressure of oil discharged from at least one of the mechanical oil pump MP and the electric oil pump EP is adjusted by a hydraulic controller 42 (see FIG. 4). The resulting oil is supplied to the components of the vehicle drive apparatus 1. In one example, the oil whose pressure has been adjusted to a predetermined pressure in accordance with a hydraulic command value is supplied to, for example, a hydraulic servo of the friction engagement device 12 and/or a hydraulic servo of a clutch brake in the transmission 16. In another example, a portion of the oil is supplied to, for example, the friction engagement elements 12a of the friction engagement device 12, friction engagement elements of the clutch brake in the transmission 16, and/or the stator 13s of the rotary electric machine 13.

In the present embodiment, the selector 31 is disposed toward the internal combustion engine EG relative to the intermediate wall 22 in the axial direction L, and the chain drive 36 is disposed toward the transmission 16 relative to the intermediate wall 22 in the axial direction L. The chain drive 36 is disposed adjacent to the intermediate wall 22. The chain drive 36 is supported by a support member 5 secured to the intermediate wall 22 from a location toward the transmission 16. The chain drive 36 thus supported is disposed adjacent to the intermediate wall 22. The chain drive 36 is disposed in a clearance created between the intermediate wall 22 and the support member 5 in the axial direction L.

As illustrated in FIGS. 3 and 4, the support member 5 consists mainly of a body 51 formed into an oddly shaped plate. The body 51 is provided with: a cylindrical insertion shaft 52, an insertion hole 53, and a large opening 54. Each of the insertion hole 53 and the large opening 54 is a through hole passing through the body 51 in the axial direction L. The insertion shaft 52 is formed to protrude from the body 51 in a direction opposite to the intermediate wall 22 (i.e., toward the transmission 16). The transmission input member 15 is inserted through a radially inner portion of the insertion shaft 52. The insertion hole 53 is provided in the form of a round hole. A portion of a pump cover of the mechanical oil pump MP and the pump shaft 46 are inserted through a radially inner portion of the insertion hole 53. The large opening 54 is provided in the form of an elongated opening larger than the insertion shaft 52 and the insertion hole 53. The large opening 54 is provided between the insertion shaft 52 and the insertion hole 53.

The first sprocket 37, which is a component of the chain drive 36, is disposed coaxially with the insertion shaft 52. The second sprocket 38 is disposed coaxially with the insertion hole 53. The chain 39 wound around the first sprocket 37 and the second sprocket 38 is disposed to partially overlap with the large opening 54 as viewed in the axial direction L. A region where the chain 39 is placed will hereinafter be referred to as a "chain placement region CH" (see the shaded region in FIG. 7). The chain placement region CH includes a portion overlapping with the large opening 54 as viewed in the axial direction L.

Figure 5:
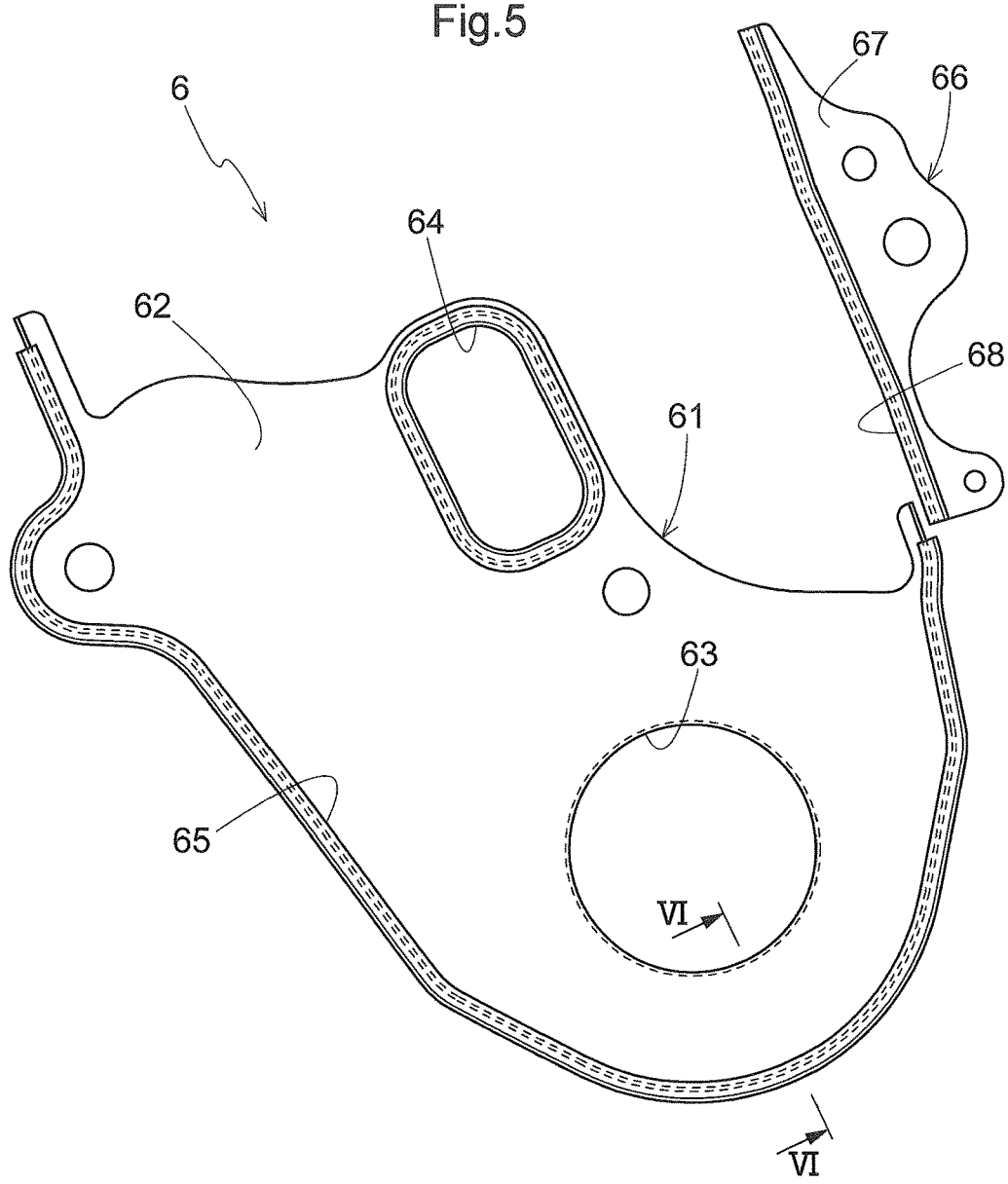
FIG. 5 is a plan view of the chain cover.

A chain cover 6 is disposed in a clearance created between the intermediate wall 22 and the support member 5 in the axial direction L. The chain cover 6 is secured to the support member 5 so as to cover the chain placement region CH from a location toward the transmission 16 (or the support member 5) in the axial direction L. As illustrated in FIGS. 4 and 5, the chain cover 6 includes at least a cover member 61 partially covering a lower portion of the chain placement region CH (i.e., a portion of the chain placement region CH located adjacent to the second sprocket 38).

The cover member 61 includes: a covering plate 62 formed into an oddly shaped flat plate; a pump shaft insertion portion 63 defined in an inner region of the covering plate 62; a tubular portion 64; and a vertical wall 65. The tubular portion 64 and the vertical wall 65 are formed to include an outer edge of the covering plate 62. The pump shaft insertion portion 63 is a region through which the pump shaft 46 is inserted. In the present embodiment, the pump shaft insertion portion 63 is formed to protrude from the covering plate 62 toward the transmission 16 in the axial direction L. The covering plate 62 is disposed so as to cover a portion of the chain placement region CH from a location toward the transmission 16 in the axial direction L, with the pump shaft insertion portion 63 externally fitted to the pump cover of the mechanical oil pump MP (see FIGS. 3 and 6).

Figure 6:
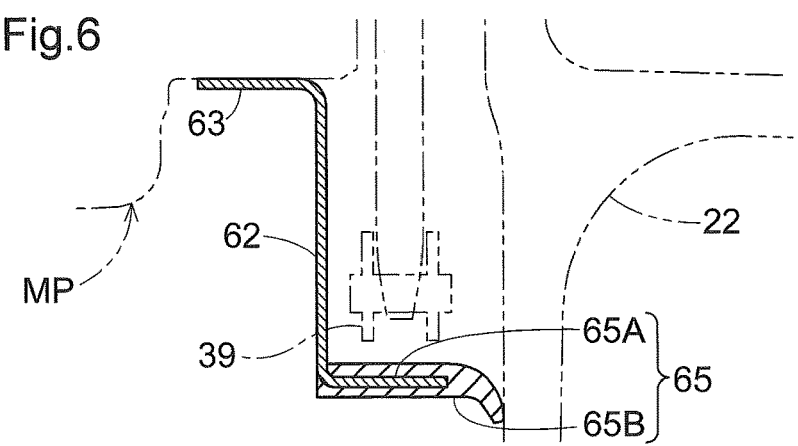
FIG. 6 is a cross-sectional view taken along the line VI-VI in FIG. 5.

The tubular portion 64 and the vertical wall 65 are formed to protrude from the covering plate 62 in a direction opposite to the pump shaft insertion portion 63 in the axial direction L (i.e., toward the internal combustion engine EG). The tubular portion 64 is located in a substantially central portion of the upper edge of the covering plate 62 and has a substantially rectangular tubular shape with an end edge. The vertical wall 65 is formed continuously along the end edge of a region of the covering plate 62 except its upper edge. As illustrated in FIG. 6, the vertical wall 65 includes: a support piece 65A rising substantially vertically from the covering plate 62; and a covering rubber 65B attached to the support piece 65A. The pump shaft insertion portion 63, the covering plate 62, and the support piece 65A may be made of a rigid material (e.g., a sheet metal) and may thus be integral with each other. The covering rubber 65B may be made of a material (e.g., a rubber plate) that is more elastic than, for example, the support piece 65A. A tip of the covering rubber 65B is tapered such that the tip is reduced in thickness toward its extremity. The tubular portion 64 may have the same structure as the vertical wall 65.

With the cover member 61 secured to the support member 5 and the support member 5 secured to the intermediate wall 22, the tip of the vertical wall 65 (i.e., the tip of the covering rubber 65B) in an elastically deformed state is in abutment with the intermediate wall 22. Similarly, the tip of the tubular portion 64 in an elastically deformed state is in abutment with the intermediate wall 22. Such an arrangement is particularly advantageous when a surface of the intermediate wall 22 facing toward the transmission 16 is not completely flat but somewhat uneven.

In the present embodiment, the chain cover 6 further includes an auxiliary member 66 in addition to the cover member 61. The auxiliary member 66 includes an elongated mounting plate 67 and a vertical wall 68 formed along a side of the mounting plate 67. The mounting plate 67 and the support member 5 are tightened together when the mounting plate 67 is secured to the support member 5. The vertical wall 68 may have the same structure as the vertical wall 65 of the cover member 61. Specifically, the vertical wall 68 may include: a support piece rising substantially vertically from the mounting plate 67; and a covering rubber attached to the support piece. The auxiliary member 66 is secured to the support member 5 such that the vertical wall 68 of the auxiliary member 66 extends from an end of the vertical wall 65 of the cover member 61 substantially along a tangent to the end of the vertical wall 65.

With the auxiliary member 66 secured to the support member 5 and the support member 5 secured to the intermediate wall 22, the tip of the vertical wall 68 (i.e., the tip of the covering rubber) in an elastically deformed state is in abutment with the intermediate wall 22. Such an arrangement is particularly advantageous when the surface of the intermediate wall 22 facing toward the transmission 16 is not completely flat but somewhat uneven.

As described above, a portion of oil discharged from at least one of the mechanical oil pump MP and the electric oil pump EP is supplied to, for example, the friction engagement elements 12a of the friction engagement device 12 and/or the stator 13s of the rotary electric machine 13 for cooling, lubrication, and/or other purposes. These components are located closer to the internal combustion engine EG than the intermediate wall 22 in the axial direction L. In contrast, the oil reservoir 41 is defined in an internal space of the case 2 at a location closer to the transmission 16 than the intermediate wall 22 in the axial direction L. Accordingly, oil that has served its purpose(s), such as cooling, lubrication, and/or other purposes, (i.e., oil discharged from the friction engagement elements 12a and/or the rotary electric machine 13) flows beyond the intermediate wall 22 in the axial direction L and is thus returned to the oil reservoir 41.

Figure 7:
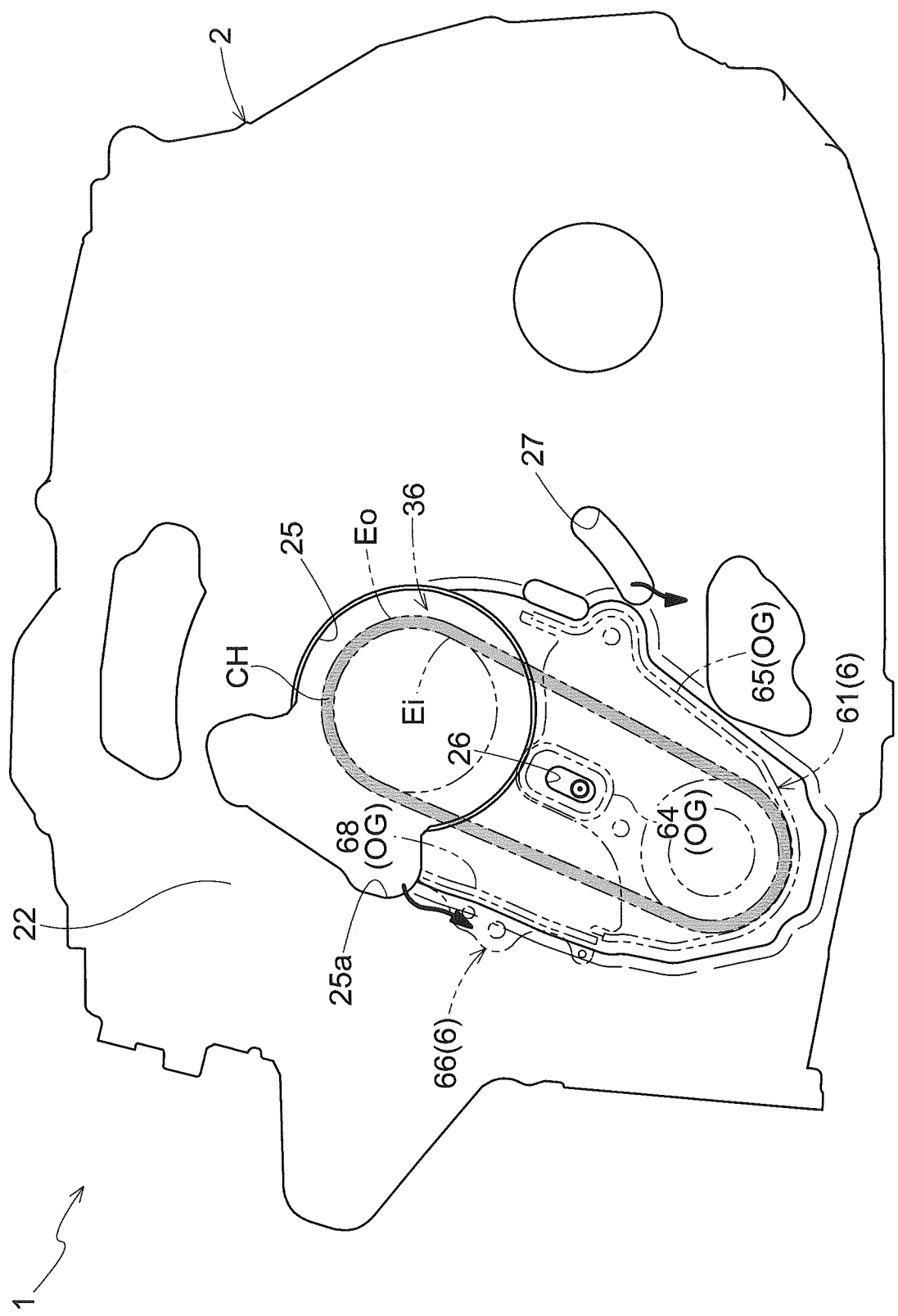
FIG. 7 is a diagram of the vehicle drive apparatus as viewed from a location toward a transmission in the axial direction.

The intermediate wall 22 is provided with at least one opening such that oil is allowed to flow beyond the intermediate wall 22 in the axial direction L. As illustrated in FIG. 7, the intermediate wall 22 according to the present embodiment is provided with a plurality of openings. More specifically, the intermediate wall 22 is provided with at least a large opening 25, a first small opening 26, and a second small opening 27. The large opening 25 is formed such that the large opening 25 is coaxial with the first sprocket 37, which is a component of the chain drive 36, and has a size enough to allow the first sprocket 37 to be located within the large opening 25 as viewed in the axial direction L. The large opening 25 includes a perfect circle opening and a projecting region 25a projecting radially outward from the perfect circle opening. The first small opening 26 and the second small opening 27 are defined at different circumferential positions and similar radial positions relative to the rotation axis of the first sprocket 37. The first small opening 26 is defined inward of an inner peripheral edge Ei of the chain placement region CH having an annular shape. The second small opening 27 is defined outward of an outer peripheral edge Eo of the annular chain placement region CH.

In the present embodiment, oil discharged from the friction engagement elements 12a of the friction engagement device 12 returns toward the oil reservoir 41 through the projecting region 25a of the large opening 25 and the first small opening 26 defined in the intermediate wall 22. In the present embodiment, the projecting region 25a of the large opening 25 and the first small opening 26 are equivalent to a "return oil hole".

As illustrated in FIG. 7, a portion of the chain placement region CH is located below the projecting region 25a of the large opening 25 at a location adjacent to a portion of the intermediate wall 22 toward the transmission 16. Thus, oil that has reached a location toward the transmission 16 through the projecting region 25a of the intermediate wall 22 unfortunately enters the chain placement region CH if the oil flows straight down. The present embodiment, however, involves placing the chain cover 6 (or specifically, the auxiliary member 66) such that the auxiliary member 66 is interposed between the projecting region 25a and the chain placement region CH. The auxiliary member 66 is secured to the support member 5 through the mounting plate 67 and is in abutment with the intermediate wall 22, with the tip of the vertical wall 68 elastically deformed. Accordingly, if oil flows down from the projecting region 25a, the oil would be blocked by the vertical wall 68 of the auxiliary member 66 and would then flow along the outer surface of the vertical wall 68. Consequently, the oil is prevented from reaching (or entering) the chain placement region CH.

A portion of the chain placement region CH is located below the first small opening 26 at a location adjacent to a portion of the intermediate wall 22 toward the transmission 16. Thus, oil that has reached a location toward the transmission 16 through the first small opening 26 of the intermediate wall 22 unfortunately enters the chain placement region CH if the oil flows straight down. The present embodiment, however, involves placing the chain cover 6 (or specifically, the tubular portion 64 of the cover member 61) such that the tubular portion 64 surrounds the entire periphery of the first small opening 26. The tubular portion 64 is in abutment with the intermediate wall 22, with the cover member 61 secured to the support member 5 and the tip of the tubular portion 64 elastically deformed. Accordingly, oil flowing from the first small opening 26 is blocked by the tubular portion 64 and then flows along the inner surface of the tubular portion 64 in the axial direction L. The tubular portion 64 is in communication with a first region 54a (see FIG. 4) of the large opening 54 defined in the support member 5, so that the oil returns to the oil reservoir 41 through the first region 54a. Consequently, the oil is prevented from reaching (or entering) the chain placement region CH.

As described above, the present embodiment involves providing the chain cover 6 (i.e., the cover member 61 and the auxiliary member 66). Thus, the present embodiment is able to guide oil from the projecting region 25a of the large opening 25 and the first small opening 26 of the intermediate wall 22 to regions other than the chain placement region CH inside the case 2. When the projecting region 25a and the first small opening 26 are inherently located in regions other than the chain placement region CH, the present embodiment is able to prevent oil, which is flowing from the projecting region 25a and the first small opening 26, from reaching the chain placement region CH. Consequently, the present embodiment is able to reduce the amount of oil entering the chain placement region CH, thus making it possible to prevent or reduce excessive oil agitation.

In the present embodiment, oil discharged from the rotary electric machine 13 returns toward the oil reservoir 41 through the second small opening 27. In the present embodiment, the second small opening 27 is equivalent to a "second return oil hole". An opening of the second small opening 27 located toward the transmission 16 (or toward the oil reservoir 41) is disposed outward of the outer peripheral edge Eo of the annular chain placement region CH. In particular, the opening of the second small opening 27 is disposed below and outward of the outer peripheral edge Eo of the chain placement region CH. Consequently, oil flowing straight down from the second small opening 27 will not reach (or enter) the chain placement region CH.

In addition, the present embodiment involves placing the chain cover 6 (or specifically, the vertical wall 65 of the cover member 61) such that the vertical wall 65 is interposed between the second small opening 27 and the chain placement region CH. The vertical wall 65 is in abutment with the intermediate wall 22, with the cover member 61 secured to the support member 5 and the tip of the vertical wall 65 elastically deformed. Thus, if oil flowing from the second small opening 27 scatters, the scattered oil would be blocked by the vertical wall 65 of the cover member 61 and would then flow along the outer surface of the vertical wall 65. Consequently, the oil is more reliably prevented from reaching (or entering) the chain placement region CH.

As described above, the present embodiment involves providing the chain cover 6 (or in particular, the cover member 61). Thus, the present embodiment is also able to prevent the oil, which is flowing from the second small opening 27 of the intermediate wall 22, from reaching the chain placement region CH. Accordingly, the present embodiment is able to effectively reduce the amount of oil entering the chain placement region CH. In the present embodiment, the vertical wall 68, the tubular portion 64, and the vertical wall 65, which are portions of the chain cover 6, define an "oil guide OG".

Effectively reducing the amount of oil entering the chain placement region CH makes it possible to effectively prevent or reduce excessive oil agitation. Preventing or reducing oil agitation makes it possible to prevent or reduce bubbling in the mechanical oil pump MP and the electric oil pump EP and to maintain the amount of oil suction at a suitable level.

Second Embodiment

A vehicle drive apparatus according to a second embodiment will be described with reference to the drawings. The second embodiment differs from the first embodiment in that the vehicle drive apparatus 1 according to the second embodiment includes no chain cover 6. Accordingly, the specific structures of the intermediate wall 22 and the support member 5 in the second embodiment are different from those in the first embodiment. The following description focuses mainly on the differences between the vehicle drive apparatus 1 according to the second embodiment and the vehicle drive apparatus 1 according to the first embodiment. Unless otherwise specified, elements similar to those of the first embodiment will be identified by the same reference signs and will not be described in detail.

Figure 8:
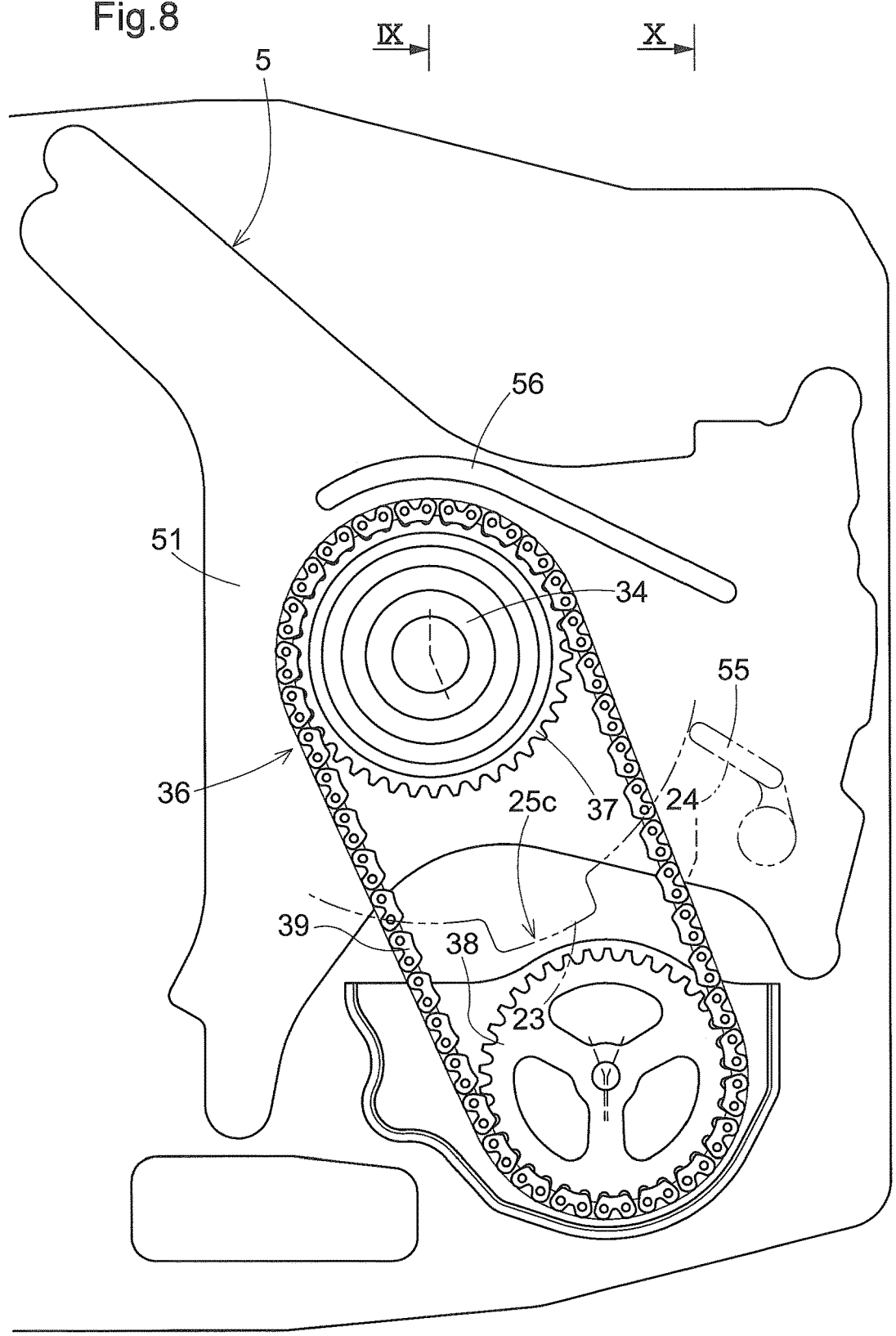
FIG. 8 is a diagram of a support member assembled to a case of a vehicle drive apparatus according to a second embodiment, as viewed from a location toward a rotary electric machine in an axial direction.
Figure 9:
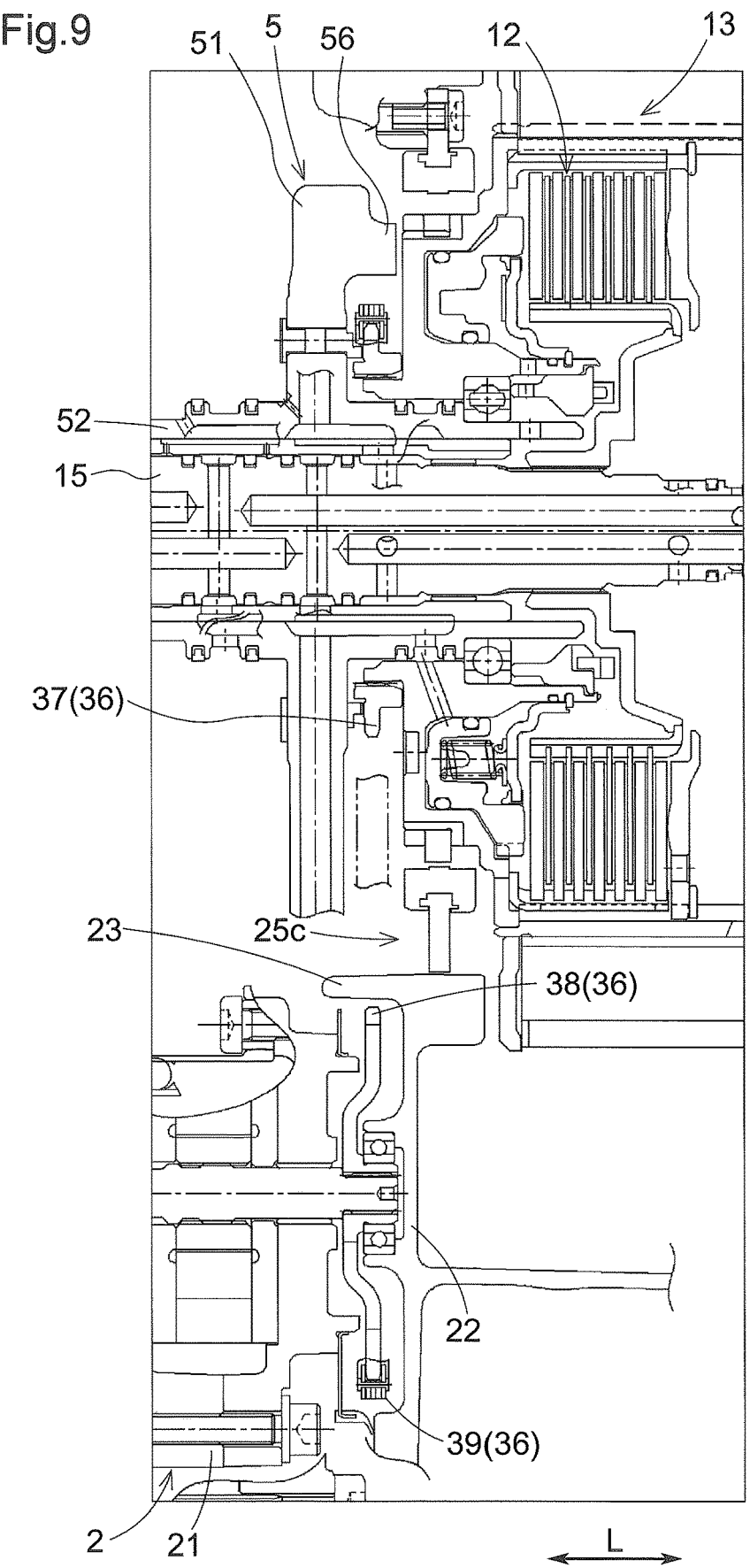
FIG. 9 is a cross-sectional view taken along the line IX-IX in FIG. 8.
Figure 10:
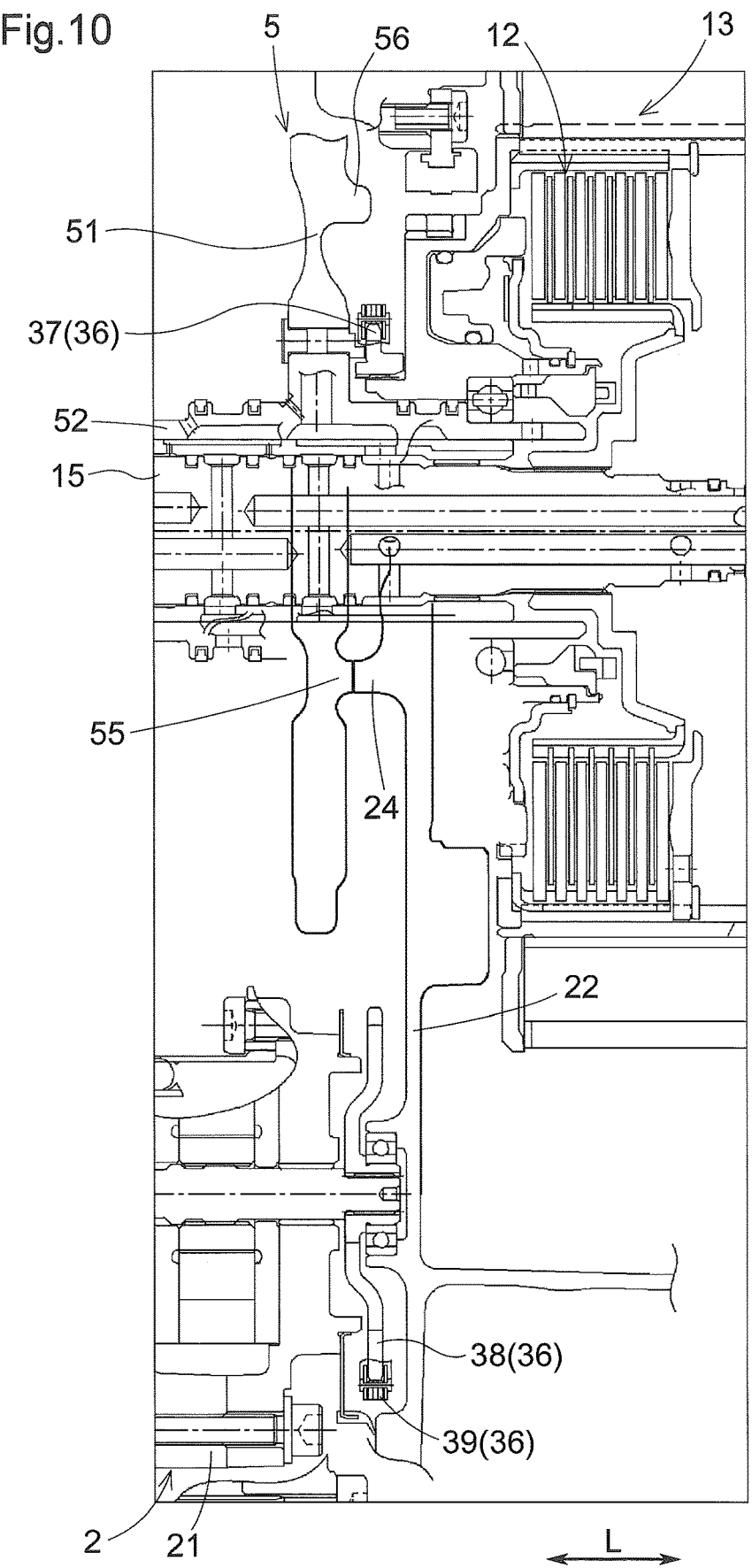
FIG. 10 is a cross-sectional view taken along the line X-X in FIG. 8.

As illustrated in FIGS. 8 to 10, the intermediate wall 22 of the case 2 of the vehicle drive apparatus 1 according to the present embodiment is provided with a gutter 23 and a rib 24. The gutter 23 and the rib 24 are formed to protrude from the intermediate wall 22 toward the transmission 16 in the axial direction L. The gutter 23 includes: a bottom wall covering a target region from below; and a pair of side walls covering the circumferential sides of the target region. The gutter 23 is disposed inward of the annular chain placement region CH as viewed in the axial direction L. The gutter 23 is formed to extend toward the transmission 16 such that the gutter 23 is located closer to the transmission 16 than the sprockets 37 and 38 and the chain 39 in the axial direction L. The rib 24 has a linear shape. The rib 24 is disposed to assume an inclined position such that the rib 24 faces obliquely downward. The rib 24 is disposed outward of the chain placement region CH as viewed in the axial direction L. A first rib 55 is protruded from the support member 5. The rib 24 is in abutment with the first rib 55 in the axial direction L.

The support member 5 secured to the intermediate wall 22 from a location toward the transmission 16 is provided with the first rib 55 and a second rib 56.

The first rib 55 and the second rib 56 are formed to protrude from the body 51 toward the rotary electric machine 13 in the axial direction L. The first rib 55 is disposed outward of the chain placement region CH as viewed in the axial direction L. The first rib 55 is in abutment with the rib 24 (which is protruded from the intermediate wall 22) in the axial direction L. The second rib 56 is disposed above the chain placement region CH.

As illustrated in FIG. 11, the large opening 25 defined in the intermediate wall 22 according to the present embodiment includes two projecting regions, i.e., an upper projecting region 25b and a lower projecting region 25c. The upper projecting region 25b is an opening region corresponding to the projecting region 25a according to the first embodiment (see FIG. 7). The lower projecting region 25c is defined in a lower end region of the large opening 25. The gutter 23 is formed around the lower projecting region 25c. Oil discharged from the friction engagement elements 12a of the friction engagement device 12 returns toward the oil reservoir 41 through the upper projecting region 25b and the lower projecting region 25c of the large opening 25 defined in the intermediate wall 22. In the present embodiment, the upper projecting region 25b and the lower projecting region 25c of the large opening 25 are equivalent to the "return oil hole".

A portion of the chain placement region CH is located below the lower projecting region 25c of the large opening 25 at a location adjacent to a portion of the intermediate wall 22 toward the transmission 16. Thus, oil that has reached a location toward the transmission 16 through the lower projecting region 25c unfortunately enters the chain placement region CH if the oil flows straight down. The present embodiment, however, involves providing the gutter 23 on the intermediate wall 22 such that the gutter 23 covers the periphery of the lower projecting region 25c from below. Accordingly, oil flowing from the lower projecting region 25c is blocked by the gutter 23, then flows along the inner surface of the gutter 23 in the axial direction L, and eventually returns to the oil reservoir 41. Consequently, the oil is prevented from reaching (or entering) the chain placement region CH.

A portion of the chain placement region CH is located below the upper projecting region 25b of the large opening 25 at a location adjacent to a portion of the intermediate wall 22 toward the transmission 16. Thus, oil that has reached a location toward the transmission 16 through the upper projecting region 25b of the large opening 25 unfortunately enters the chain placement region CH if the oil flows straight down. The present embodiment, however, involves providing the first rib 55 and the second rib 56 on the support member 5 and providing the rib 24 (which abuts on the first rib 55) on the intermediate wall 22 such that the first rib 55, the second rib 56, and the rib 24 are interposed between the upper projecting region 25b and the chain placement region CH. Accordingly, oil flowing down from the upper projecting region 25b is blocked by the second rib 56 of the support member 5 and then flows along the outer surface of the second rib 56. Oil flowing down from the second rib 56 is blocked by first rib 55 of the support member 5 and the rib 24 of the intermediate wall 22 (which are in abutment with each other in the axial direction L) and then flows along the outer surfaces of the first rib 55 and the rib 24. Consequently, the oil is prevented from reaching (or entering) the chain placement region CH.

As described above, the present embodiment involves changing the shapes of the intermediate wall 22 and the support member 5 (or specifically, involves providing the gutter 23, the rib 24, the first rib 55, and the second rib 56). Thus, the present embodiment is able to guide oil from the upper projecting region 25b and the lower projecting region 25c of the large opening 25 of the intermediate wall 22 to regions other than the chain placement region CH inside the case 2. When the upper projecting region 25b and the lower projecting region 25c are inherently located in regions other than the chain placement region CH, the present embodiment is able to prevent the oil, which is flowing from the upper projecting region 25b and the lower projecting region 25c, from reaching the chain placement region CH. Consequently, the present embodiment is able to reduce the amount of oil entering the chain placement region CH. In the present embodiment, the gutter 23 and the rib 24 of the intermediate wall 22 and the first rib 55 and the second rib 56 of the support member 5 define the "oil guide OG".

Effectively reducing the amount of oil entering the chain placement region CH as described above makes it possible to effectively prevent or reduce excessive oil agitation. Preventing or reducing oil agitation makes it possible to prevent or reduce bubbling in the mechanical oil pump MP and the electric oil pump EP and to maintain the amount of oil suction at a suitable level. The present embodiment eliminates the need for the use of the chain cover 6 by changing the shapes of the intermediate wall 22 and the support member 5. The present embodiment is thus able to maintain the amount of oil suction at a suitable level as mentioned above while promoting cost reduction.

Alternative Embodiments (1) The first embodiment has been described by way of example as having a structure in which a portion of the chain cover 6 defines the oil guide OG The present disclosure, however, is not limited to this structure. In one example, dedicated component(s) may be used to define the oil guide OG (2) The first embodiment has been described by way of example as having a structure in which the vertical wall 65 of the cover member 61, which is a component of the chain cover 6, includes the support piece 65A and the covering rubber 65B attached thereto, and the tip of the covering rubber 65B in an elastically deformed state is in abutment with the intermediate wall 22. The present disclosure, however, is not limited to this structure. In one example, the tip of the covering rubber 65B may abut on the intermediate wall 22 while undergoing substantially no elastic deformation. In another example, the vertical wall 65 may consist of a member integral with the covering plate 62, the pump shaft insertion portion 63, and the tubular portion 64 instead of being made up of two members including the covering rubber 65B.

(3) The first embodiment has been described by way of example as having a structure in which the vertical wall 65 of the cover member 61 is disposed such that the vertical wall 65 is interposed between the second small opening 27 and the chain placement region CH. The present disclosure, however, is not limited to this structure. As long as the opening of the second small opening 27 is disposed below and outward of the outer peripheral edge Eo of the chain placement region CH, the vertical wall 65 of the cover member 61 does not necessarily have to be interposed between the second small opening 27 and the chain placement region CH.

(4) The specific structures of the intermediate wall 22, the support member 5, and the chain cover 6, which have been described in the foregoing embodiments, are only illustrative. The details of the specific structures may be changed as appropriate for application.

(5) The structure(s) disclosed in the above-described embodiments may be combined with structure(s) disclosed in other embodiment(s) for application, as long as no contradiction arises. The above-described embodiments include the foregoing embodiments and the alternative embodiments. The same goes for the following description. Other structures of the embodiments disclosed herein are illustrative in all respects and may be changed as appropriate without departing from the scope of the present disclosure.

Summary of Embodiments

In summary, the vehicle drive apparatus according to the present disclosure preferably has the following structures.

The vehicle drive apparatus includes: an input member (11) drivingly connected to an internal combustion engine (EG); an output member (17) drivingly connected to a wheel (W); a friction engagement device (12); a rotary electric machine (13) drivingly connected to the input member (11) through the friction engagement device (12); a transmission (16) disposed between the rotary electric machine (13) and the output member (17); an oil pump (MP); and a case (2) housing the input member (11), the output member (17), the friction engagement device (12), the rotary electric machine (13), the transmission (16), and the oil pump (MP).

The case (2) includes an intermediate wall (22) disposed between the friction engagement device (12) and the transmission (16) and between the rotary electric machine (13) and the transmission (16) in an axial direction (L).

An oil reservoir (41) to store oil is defined in an internal space of the case (2) at a location closer to the transmission (16) than the intermediate wall (22).

The oil pump (MP) supplies oil stored in the oil reservoir (41) to a friction engagement element (12a) of the friction engagement device (12).

The intermediate wall (22) is provided with a return oil hole (25a, 25b, 25c, 26) through which oil discharged from the friction engagement element (12a) returns toward the oil reservoir (41).

A chain drive (36) is disposed adjacent to a portion of the intermediate wall (22) toward the transmission (16). The chain drive (36) includes a chain (39) to transmit a driving force from at least one of the input member (11) and the rotary electric machine (13) to the oil pump (MP).

The vehicle drive apparatus further includes an oil guide (OG) through which oil flowing through the return oil hole (25a, 25b, 25c, 26) is guided to a region other than a chain placement region (CN) inside the case (2). The chain placement region (CH) is a region where the chain (39) is placed.

The oil flowing through the return oil hole (25a, 25b, 25c, 26) is guided through the oil guide and returned to the oil reservoir.

This structure includes the oil guide (OG). Thus, oil flowing toward the transmission (16) through the return oil hole (25a, 25b, 25c, 26) defined in the intermediate wall (22) of the case (2) is returnable to the oil reservoir (41) through a region other than the chain placement region (CH), i.e., through a region where no chain (39) is placed. Accordingly, if the chain drive (36) is disposed adjacent to the intermediate wall (22) provided inside the case (2), this structure would reduce the amount of oil that enters the chain placement region (CH) of the chain drive (36) after having reached a location toward the oil reservoir (41) through the return oil hole (25a, 25b, 25c, 26). Consequently, this structure is able to reduce or prevent an increase in oil agitation caused by the chain.

In one aspect, the vehicle drive apparatus preferably includes a chain cover (6) covering the chain placement region (CH).

The chain cover (6) is preferably secured to the intermediate wall (22) from a location toward the transmission (16).

At least a portion of the oil guide (OG) is preferably formed by the chain cover (6).

This structure involves securing the chain cover (6) to the intermediate wall (22) from the location toward the transmission (16) and is thus able to form at least a portion of the oil guide (OG) using the chain cover (6). This makes it possible to easily reduce or prevent an increase in oil agitation caused by the chain with a relatively simple structure. This structure involves covering the chain placement region (CH) with the chain cover (6) and is thus able to reduce the amount of oil entering the chain placement region (CH) from regions other than the return oil hole (25a, 25b, 25c, 26). Consequently, this structure is able to reduce oil agitation caused by the chain.

In another aspect, the intermediate wall (22) is preferably provided with a second return oil hole (27) through which oil discharged from the rotary electric machine (13) returns toward the oil reservoir (41).

An opening of the second return oil hole (27) located toward the oil reservoir (41) is preferably disposed at a location outward of an outer peripheral edge (Eo) of the chain placement region (CH) having an annular shape, such that oil discharged from the second return oil hole (27) is prevented from entering the chain placement region (CH).

In this structure, oil flowing toward the oil reservoir (41) through the second return oil hole (27) defined in the intermediate wall (22) of the case (2) is guidable to a region which is located outward of the chain placement region (CH) and in which no chain (39) is placed. Accordingly, this structure is also able to reduce the amount of oil that enters the chain placement region (CH) of the chain drive (36) after having reached a location toward the oil reservoir (41) through the second return oil hole (27). Consequently, this structure is able to reduce or prevent an increase in oil agitation caused by the chain.

In still another aspect, the oil guide (OG) preferably includes a tubular portion (64) which passes through a region inward of an inner peripheral edge (Ei) of the annular chain placement region (CH) in the axial direction (L) and through which the return oil hole (25a, 25b, 25c, 26) is in communication with the oil reservoir (41).

In this structure, oil flowing toward the oil reservoir (41) through the return oil hole (25a, 25b, 25c, 26) defined in the intermediate wall (22) of the case (2) is allowed to pass through a region which is located inward of the chain placement region (CH) and in which no chain (39) is placed. Accordingly, this structure is able to reduce the amount of oil that enters the chain placement region (CH) of the chain drive (36) after having reached a location toward the oil reservoir (41) through the return oil hole (25a, 25b, 25c, 26). Consequently, an increase in oil agitation caused by the chain is preventable or reducible with a simple structure.

In yet another aspect, the return oil hole (25a, 25b, 25c, 26) is preferably provided to include a region of the intermediate wall (22) facing a lower end of the friction engagement element (12a).

In this structure, oil that has cooled the friction engagement element (12a) of the friction engagement device (12) and has then been discharged therefrom is suitably returnable toward the oil reservoir (41) through the return oil hole (25a, 25b, 25c, 26).

In still yet another aspect, the intermediate wall (22) is preferably provided with a second return oil hole (27) through which oil discharged from the rotary electric machine (13) returns toward the oil reservoir (41).

The return oil hole (25a, 25b, 25c, 26) and the second return oil hole (27) are preferably provided independently of each other.

In this structure, oil that has cooled the friction engagement element (12a) of the friction engagement device (12) and has then been discharged therefrom, and oil that has cooled the rotary electric machine (13) and has then been discharged therefrom are returnable toward the oil reservoir (41) through the return oil hole (25a, 25b, 25c, 26) and the second return oil hole (27), respectively.

The vehicle drive apparatus according to the present disclosure preferably achieves at least one of the effects described above.

DESCRIPTION OF THE REFERENCE NUMERALS 1 vehicle drive apparatus
2 case
6 chain cover
11 input member
12 friction engagement device
12a friction engagement element
13 rotary electric machine
16 transmission
17 output member
22 intermediate wall
25a projecting region (return oil hole)
25b upper projecting region (return oil hole)
25c lower projecting region (return oil hole)
26 first small opening (return oil hole)
27 second small opening (second return oil hole)
28 small opening (second return oil hole)
36 chain drive
39 chain
41 oil reservoir
EG internal combustion engine
W wheel
MP mechanical oil pump (oil pump)
OG oil guide
CH chain placement region
Ei inner peripheral edge
Eo outer peripheral edge
L axial direction

The invention claimed is:

1. A vehicle drive apparatus comprising: an input member drivingly connected to an internal combustion engine; an output member drivingly connected to a wheel; a friction engagement device; a rotary electric machine drivingly connected to the input member through the friction engagement device; a transmission disposed between the rotary electric machine and the output member; an oil pump; and a case housing the input member, the output member, the friction engagement device, the rotary electric machine, the transmission, and the oil pump, wherein the case includes an intermediate wall disposed between the friction engagement device and the transmission and between the rotary electric machine and the transmission in an axial direction, an oil reservoir to store oil is defined in an internal space of the case on a side of the intermediate wall that faces the transmission, the intermediate wall is provided with a return oil hole through which oil discharged from the friction engagement element returns toward the oil reservoir, a chain drive is disposed adjacent to a portion of the intermediate wall that faces the transmission, the chain drive including a chain to transmit a driving force from at least one of the input member and the rotary electric machine to the oil pump, the vehicle drive apparatus further comprises an oil guide through which oil flowing through the return oil hole is guided to a region other than a chain placement region inside the case, the chain placement region being a region where the chain is placed, and the oil flowing through the return oil hole is guided through the oil guide and returned to the oil reservoir.

2. The vehicle drive apparatus according to claim 1, comprising a chain cover covering the chain placement region, wherein the chain cover is secured to the intermediate wall from a location that faces the transmission, and at least a portion of the oil guide is formed by the chain cover.

3. The vehicle drive apparatus according to claim 2, wherein the intermediate wall is provided with a second return oil hole through which oil discharged from the rotary electric machine returns toward the oil reservoir, and an opening of the second return oil hole located relative to the chain placement region having an annular shape, such that oil discharged from the second return oil hole is prevented from entering the chain placement region.

4. The vehicle drive apparatus according to claim 3, wherein the oil guide includes a tubular portion located radially inside an inner peripheral edge of the annular chain placement region and passing through the axial direction and through which the return oil hole is in communication with the oil reservoir.

5. The vehicle drive apparatus according to claim 4, wherein the return oil hole is provided to include a region of the intermediate wall facing a lower end of the friction engagement element.

6. The vehicle drive apparatus according to claim 5, wherein the return oil hole and the second return oil hole are provided independently of each other.

7. The vehicle drive apparatus according to claim 2, wherein
the oil guide includes a tubular portion located radially inside an inner peripheral edge of the annular chain placement region and passing through the axial direction and through which the return oil hole is in communication with the oil reservoir.

8. The vehicle drive apparatus according to claim 2, wherein
the return oil hole is provided to include a region of the intermediate wall facing a lower end of the friction engagement element.

9. The vehicle drive apparatus according to claim 1, wherein
the intermediate wall is provided with a second return oil hole through which oil discharged from the rotary electric machine returns toward the oil reservoir, and
an opening of the second return oil hole located relative to the chain placement region having an annular shape, such that oil discharged from the second return oil hole is prevented from entering the chain placement region.

10. The vehicle drive apparatus according to claim 9, wherein
the oil guide includes a tubular portion located radially inside an inner peripheral edge of the annular chain placement region and passing through the axial direction and through which the return oil hole is in communication with the oil reservoir.

11. The vehicle drive apparatus according to claim 10, wherein
the return oil hole is provided to include a region of the intermediate wall facing a lower end of the friction engagement element.

12. The vehicle drive apparatus according to claim 11, wherein
the return oil hole and the second return oil hole are provided independently of each other.

13. The vehicle drive apparatus according to claim 9, wherein
the return oil hole is provided to include a region of the intermediate wall facing a lower end of the friction engagement element.

14. The vehicle drive apparatus according to claim 1, wherein
the oil guide includes a tubular portion located radially inside an inner peripheral edge of the annular chain placement region and passing through the axial direction and through which the return oil hole is in communication with the oil reservoir.

15. The vehicle drive apparatus according to claim 14, wherein
the return oil hole is provided to include a region of the intermediate wall facing a lower end of the friction engagement element.

16. The vehicle drive apparatus according to claim 15, wherein
the intermediate wall is provided with a second return oil hole through which oil discharged from the rotary electric machine returns toward the oil reservoir, and
the return oil hole and the second return oil hole are provided independently of each other.

17. The vehicle drive apparatus according to claim 14, wherein
the intermediate wall is provided with a second return oil hole through which oil discharged from the rotary electric machine returns toward the oil reservoir, and
the return oil hole and the second return oil hole are provided independently of each other.

18. The vehicle drive apparatus according to claim 1, wherein
the return oil hole is provided to include a region of the intermediate wall facing a lower end of the friction engagement element.

19. The vehicle drive apparatus according to claim 18, wherein
the intermediate wall is provided with a second return oil hole through which oil discharged from the rotary electric machine returns toward the oil reservoir, and
the return oil hole and the second return oil hole are provided independently of each other.

20. The vehicle drive apparatus according to claim 1, wherein
the intermediate wall is provided with a second return oil hole through which oil discharged from the rotary electric machine returns toward the oil reservoir, and
the return oil hole and the second return oil hole are provided independently of each other.

* * * * *